United States Patent
Hammons et al.

(10) Patent No.: US 10,310,948 B2
(45) Date of Patent: Jun. 4, 2019

(54) EVALUATION OF RISK OF DATA LOSS AND BACKUP PROCEDURES

(71) Applicant: Dell Products, L.P., Round Rock, TX (US)

(72) Inventors: Marc Hammons, Round Rock, TX (US); Michael Gatson, Austin, TX (US); Yuan-Chang Lo, Austin, TX (US); Philip Seibert, Austin, TX (US); Todd Swierk, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 248 days.

(21) Appl. No.: 15/208,801

(22) Filed: Jul. 13, 2016

(65) Prior Publication Data

US 2018/0018108 A1 Jan. 18, 2018

(51) Int. Cl.
*G06F 3/06* (2006.01)
*G06F 11/14* (2006.01)
*G06F 11/30* (2006.01)
*G06F 11/34* (2006.01)

(52) U.S. Cl.
CPC ...... *G06F 11/1461* (2013.01); *G06F 11/3034* (2013.01); *G06F 11/3058* (2013.01); *G06F 11/3438* (2013.01)

(58) Field of Classification Search
CPC ......... G06F 3/0619; G06F 3/065; G06F 3/067
See application file for complete search history.

(56) References Cited

U.S. PATENT DOCUMENTS

| 9,532,734 B2* | 1/2017 | Hoffman | G01C 21/20 |
| 2013/0290623 A1* | 10/2013 | Akagawa | G06F 11/2094 711/112 |
| 2014/0143610 A1* | 5/2014 | Nakatsugawa | G06F 11/008 714/47.3 |
| 2016/0342483 A1* | 11/2016 | Klingenberg | G06F 11/1461 |

* cited by examiner

*Primary Examiner* — Reginald G Bragdon
*Assistant Examiner* — Edward Wang
(74) *Attorney, Agent, or Firm* — Fogarty LLP

(57) ABSTRACT

Systems, devices and methods for the assessment and mitigation of risk associated with the potential loss of data stored by an IHS (Information Handling System). The risk assessment incorporates contextual and behavioral data provided by the IHS where the data describes file operations by the IHS, the physical use of the IHS, system information that describes the platform of the IHS and hardware installed on the IHS and data backup procedures implemented by the IHS. Based on the data associated with an IHS, a scoring algorithm determines a behavioral risk of loss that reflects the use of the IHS and a contextual risk of loss that reflects user input to individual files, thus indicating the time required to recreate a file. The backup procedures implemented by the IHS are then evaluated in light of the determined risk assessment. Backup procedure recommendations that mitigate the identified risks are provided to the IHS.

11 Claims, 4 Drawing Sheets

EVALUATION OF RISK OF DATA LOSS AND BACKUP PROCEDURES

FIELD

This disclosure relates generally to software backup procedures for Information Handling Systems (IHSs), and more specifically, to mitigating the risk of losing data.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A wide variety of software applications may be installed on an IHS, such as a personal computer. These software applications include both user-level software applications and lower-level software applications that are responsible for various aspects of the IHS's capabilities. These software applications may be regarded as collections of files of various types. For instance, a software application may consists of program code files that are used to implement the functionality of the software application. In addition, each software application may utilize a variety of resource files that are used to store information such as settings that are used by the application. Various output files may be generated as a result of the user's operation of the software application. Certain applications may require the use of files such as drivers used for interfacing with the hardware of the IHS. In addition to files that are associated with individual software applications, an IHS may utilize various types of general resource files, such as registry settings, encryption keys and security certificates.

In addition to the various types of software application files, these software applications may be used to generate and edit many different types of files. For instance, a word processing application may be used to create various types of documents. A CAD (computer assisted design) program may be used over the course of days, weeks or even years to create various types of engineering drawings. Some of these user created files may represent a large investment of time by the user. For instance, a spreadsheet program may be used to maintain records for ongoing projects that can span over numerous years. Such files may be literally irreplaceable, but may nonetheless be vulnerable to loss due to the use of inadequate backup procedures.

The wide assortment of files that may be stored by an IHS significantly complicates the ability for a user to implement efficient data backup procedures. Backup procedures that create a backup copy of every file on a device requires large amounts of storage space and results in many files being needlessly backed up. More selective back up procedures require the identification of the files, file extensions and/or directories to be backed up. For instance, configuration of a backup protocol may require a user to identify all directories on an IHS to be backed up to a remote location. This can result in a complex and error-prone task that requires a user to understand the directories and files used by each software application. This task can be complicated by the use of non-standard installation settings, the use of uncommon file extensions and the use of non-standard hardware, such as an additional storage drive, used by an IHS. This task is complicated further with respect to low-level software applications that operate without the user's knowledge. Complicating the problem still further for the user is the proliferation of different devices that are relied upon by the user.

The degree of difficulty in implementing effective backup procedures in such complex environments results in many users forgoing the use of software backups altogether. In some scenarios, a user may be able to implement an effective backup procedure for certain types of files that are deemed of particular importance, such as financial records or music files, but such methods leave much of the user's data unprotected from loss. However, even such users that are able to implement partial backup processes often fail to adequately protect data that is difficult and/or costly to replace. In such situations, users may not realize these backup procedures are being used to back up easily replaceable files, while irreplaceable files are left unprotected. If a user is paying for backup software or a backup service to implement these backup procedures, the user's backup resources could be better spent.

SUMMARY

A method is provided according to various embodiments for improving the data backup procedures utilized by an IHS (Information Handling System), the method including receiving risk data describing the use of a first IHS, wherein the risk data includes information describing file operations on the first IHS and wherein the risk data further includes information describing the physical use of the first IHS and wherein the risk data identifies a current data backup procedure implemented by the IHS; determining, based on the risk data, platform information for the first IHS, wherein the platform information specifies hardware installed on the first IHS; determining, based on the received risk data and the platform information, a behavioral risk of loss of data stored by the first IHS; determining, based on the received risk data, a contextual risk of loss of data stored by the first IHS; and evaluating the current backup procedure of the first IHS based on the determined behavioral risk of loss and the determined contextual risk of loss.

According to various additional embodiments; the method further includes generating a backup procedure recommendation based on the evaluation of the current backup procedure, wherein the recommended backup procedure reduces the risk of loss of data stored by the IHS. According to various additional embodiments of the method, the behavioral risk is determined based on risk data describing movement of the IHS. According to various additional embodiments of the method, the contextual risk is determined based on risk data describing a cost to replace a file stored by the IHS. According to various additional embodiments of the method, the cost to replace the file is determined based on whether the file has been edited by a user of the IHS. According to various additional embodiments of the method, the behavioral risk is determined further based on risk data describing the types of data storage devices utilized by the IHS. According to various additional embodiments of the method, the cost to replace the file is determined also based on a time duration spent editing the file by the user of the IHS.

A method is provided according to various embodiments for improving the data backup procedures utilized by an IHS (Information Handling System), the method including generating first risk data describing one or more physical movements of the IHS, wherein the physical movement information is generated by a sensor component of the IHS; generating second risk data describing one or more operations on a file stored by the IHS; generating third risk data identifying a current data backup procedure implemented by the IHS; transmitting the first risk data, the second risk data and the third risk data to a remote risk assessment service, wherein the remote risk assessment service evaluates the current backup procedure based on the first risk data and the second risk data; and receiving, from the remote risk assessment service, a backup procedure recommendation, wherein the recommended backup procedure reduces the risk of loss of data stored by the IHS.

According to various additional embodiments of the method, the method further includes generating fourth risk data describing hardware properties of the IHS, wherein the hardware properties identify one or more data storage devices utilized by the IHS; and transmitting the fourth risk data to the remote risk assessment service; wherein the current backup procedure is evaluated based on the ability of the one or more data storage devices to operate without failure during the physical movements described by the first risk data. According to various additional embodiments of the method, the physical movement information is generated by an accelerometer component of the IHS. According to various additional embodiments of the method, the physical movement information is generated by a GPS (global positioning system) component of the IHS. According to various additional embodiments of the method, the file operations describing a cost to replace the file stored by the IHS. According to various additional embodiments of the method, the cost to replace the file is determined based on whether the file has been edited by a user of the IHS. According to various additional embodiments of the method, the cost to replace the file is determined also based on a time duration spent editing the file by the user of the IHS.

According to various embodiments an IHS (Information Handling System) includes a host processor; a movement sensor configured to provide movement information describing physical movement of the IHS; and a computer-readable medium coupled to the host processor, the computer-readable medium having program instructions stored thereon that, upon execution by the host processor, cause the IHS to: retrieve movement information from the movement sensor; generate first risk data describing one or more physical movements of the IHS; generate second risk data describing one or more operations on a file stored by the IHS; generate third risk data identifying a current data backup procedure implemented by the IHS; transmit the first risk data, the second risk data and the third risk data to a remote risk assessment service, wherein the remote risk assessment service evaluates the current backup procedure based on the first risk data and the second risk data; and receive, from the remote risk assessment service, a backup procedure recommendation, wherein the recommended backup procedure reduces the risk of loss of data stored by the IHS.

According to various additional embodiments of the system, the program instructions, upon execution by the host processor, further cause the IHS to: generate fourth risk data describing hardware properties of the IHS, wherein the hardware properties identify one or more data storage devices utilized by the IHS; and transmit the fourth risk data to the remote risk assessment service; wherein the current backup procedure is evaluated based on the ability of the one or more data storage devices to operate without failure during the physical movements described by the first risk data. According to various additional embodiments of the system, the movement sensor is an accelerometer component of the IHS. According to various additional embodiments of the system, the movement sensor is a GPS (global positioning system) component of the IHS. According to various additional embodiments of the system, the file operations describing a cost to replace the file stored by the IHS. According to various additional embodiments of the system, the cost to replace the file is determined based on whether the file has been edited by a user of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal desktop or laptop computer, a mobile phone, a tablet, a 2-in1 laptop/tablet, a server computer, a consumer electronic device, a gaming console, a printer, an automobile information system, a network storage device, a network router, a network video camera, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a magnetic hard drive, an optical drive, a solid-state drive), a sequential access storage device (e.g., a tape drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic strips, mechanically or optically read punched cards, or radio frequency identification tags.

Figure 1:
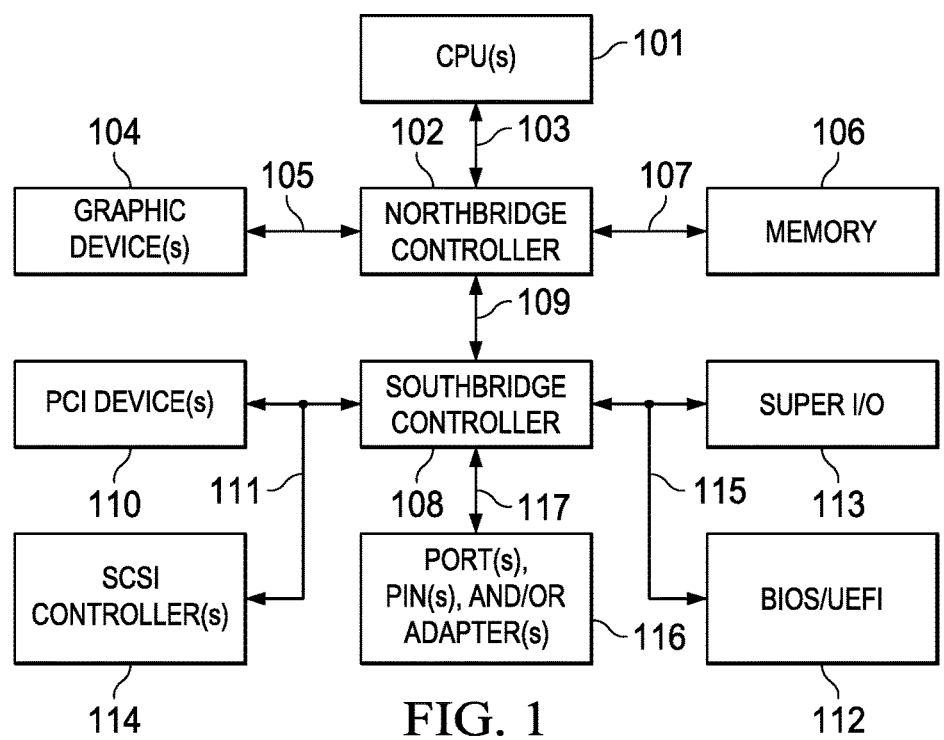
FIG. 1 is a block diagram illustrating certain components of an IHS.

FIG. 1 is a block diagram of certain components of an IHS, as described with respect to an IHS configured according to various embodiments for providing risk assessment for data loss by the IHS based on contextual and behavioral risk factors associated with the use of the IHS. As illustrated, an IHS may include one or more CPUs 101. In various embodiments, an IHS may be a single-processor system including one CPU 101, or a multi-processor system including two or more CPUs 101 (e.g., two, four, eight, or any other suitable number). CPU(s) 101 may include any processor capable of executing program instructions. For example, in various embodiments, CPU(s) 101 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 101 may commonly, but not necessarily, implement the same ISA.

In certain embodiments, CPU(s) 101 are coupled to northbridge controller or chipset 101 via front-side bus 103. Northbridge controller 102 may be configured to coordinate I/O traffic between CPU(s) 101 and other components. For example, in the illustrated embodiment, northbridge controller 102 is coupled to graphics device(s) 104 (e.g., one or more video cards or adaptors) via graphics bus 105 (e.g., an Accelerated Graphics Port or AGP bus, a Peripheral Component Interconnect or PCI bus, or the like). Northbridge controller 102 may also be coupled to system memory 106 via memory bus 107. According to various embodiments, memory 106 may be configured to store program instructions, and/or data accessible by CPU(s) 101. In various embodiments, memory 106 may be implemented using any suitable memory technology, such as static RAM (SRAM), synchronous dynamic RAM (SDRAM), nonvolatile/Flash-type memory, or any other type of memory.

Northbridge controller 102 may be coupled to southbridge controller or chipset 108 via internal bus 109. Southbridge controller 108 may be configured to handle various I/O capabilities supported by an IHS, and it may provide interfaces such as, for instance, Universal Serial Bus (USB), audio, serial, parallel, Ethernet, or the like via port(s), pin(s), and/or adapter(s) 116 over bus 117. For example, southbridge controller 108 may be configured to provide trusted communication of risk data between an IHS and a remote risk inference service. In various embodiments, southbridge controller 108 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol. As described, the I/O capabilities of an IHS may be utilized to interface via a networking protocol with a remote risk inference service.

Southbridge controller 108 may also enable connection to one or more keyboards, keypads, touch screens, scanning devices, voice or optical recognition devices, or any other devices suitable for entering or retrieving data. Multiple I/O devices may be present in an IHS. In some embodiments, I/O devices may be separate from an IHS and may interact with an IHS through a wired or wireless connection. As shown, southbridge controller 108, may be further coupled to one or more PCI devices 110 (e.g., modems, network cards, sound cards, or video cards) and to one or more SCSI controllers 114 via parallel bus 111. Southbridge controller 108 may also be coupled to Basic I/O System (BIOS)/UEFI 112 and to Super I/O Controller 113 via Low Pin Count (LPC) bus 115. Super I/O Controller 113 may combine interfaces for a variety of lower bandwidth or low data rate devices. Those devices may include, for example, floppy disks, parallel ports, keyboard and mouse, environmental sensors and fan speed monitoring/control, among others.

BIOS/UEFI 112 may include non-volatile memory having program instructions stored thereon. Those instructions may be usable CPU(s) 101 to initialize and test other hardware components and/or to load an Operating System (OS) for operation of an IHS. The BIOS/UEFI 112 initializes and tests the hardware components of an IHS, executes any pre-boot processes, such as Dell ePSA diagnostic processes in certain embodiments, and loads a boot loader or an OS from a memory device. The BIOS/UEFI 112 provides an abstraction layer for the hardware which enables software executed by the IHS to interact with certain I/O devices such as keyboards, displays, etc. Incidentally, the Unified Extensible Firmware Interface (UEFI) was designed as a successor to BIOS to address certain technical issues. As a result, modern IHSs predominantly use UEFI firmware and the term BIOS, as used herein, is intended also encompass UEFI firmware and future variations thereof.

Figure 2:
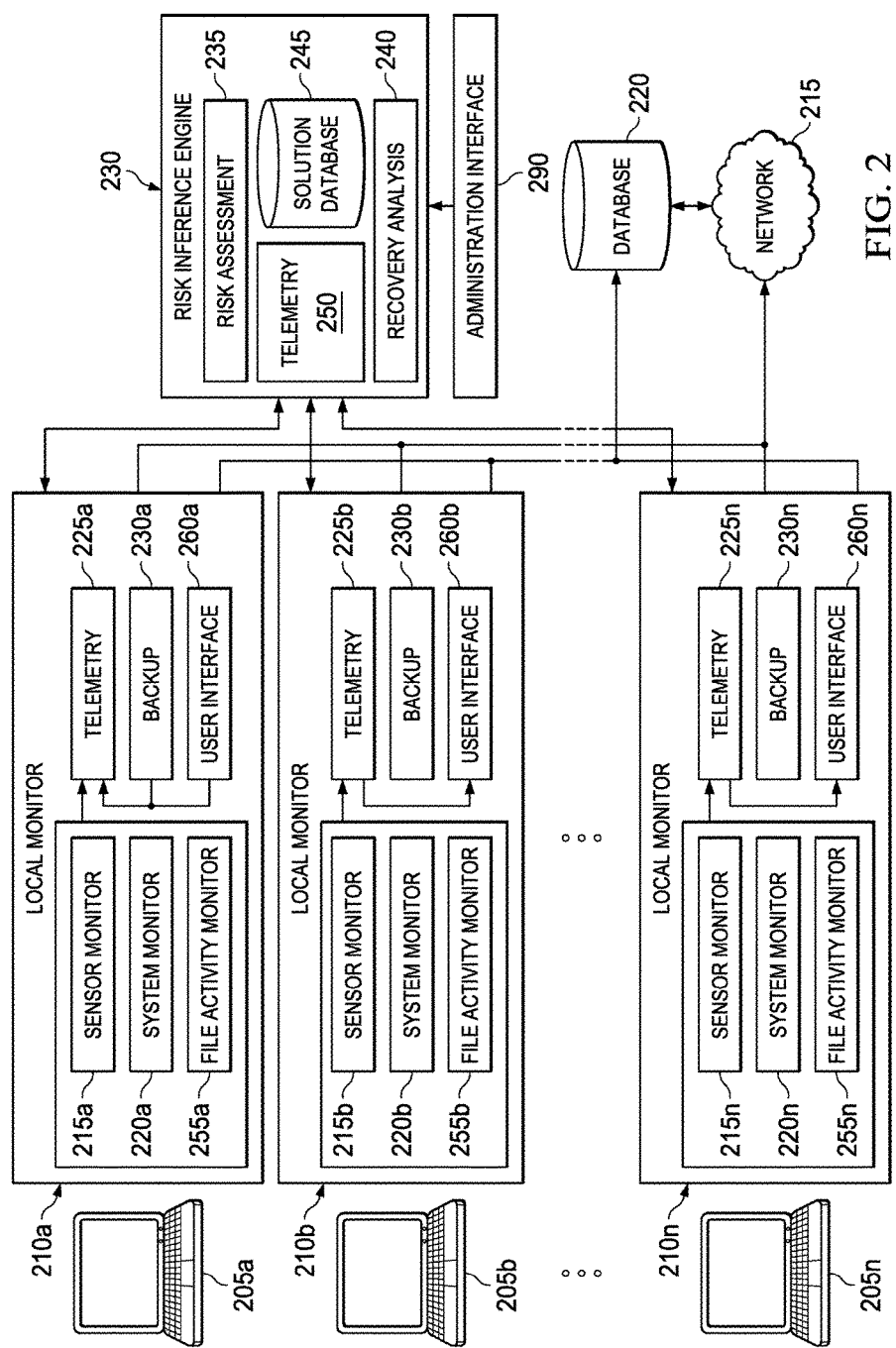
FIG. 2 is a diagram illustrating an example of an environment where systems and methods systems are configured according to various embodiments to provide data loss risk assessment utilizing risk data provided by a plurality of IHSs.

FIG. 2 illustrates a system according to various embodiments, where the system is configured to provide risk assessment procedures that utilize contextual and behavioral risk data provided by each participating IHS 205a-n. Embodiments may utilize various combinations of contextual and behavioral risk data that is generated via local monitors 210a-n located on participating IHSs 205a-n. In certain of the various embodiments, a risk inference engine 230 processes the provided risk data in order to determine risk assessment and to generated backup recommendations for data stored by an IHS 205a-n. These backup recommendations generated by the risk inference engine 230 may then be used by the participating IHSs 205a-n to implement software backup procedures that reduce the risk of data loss in light of the manner in which the participating IHSs 205a-n are used.

In the illustrated embodiment of FIG. 2, each of the participating IHSs 205a-n are laptop computers. As described above, an IHS may be one of various different types of computing devices. Accordingly, in certain embodiments, one of more of the participating IHSs 205a-n of FIG. 2 may instead be IHSs other than laptop computers that are configured to provide risk data to a risk inference service and further configured to receive and utilize backup procedure recommendations. In the illustrated embodiment, the risk inference engine 230 is depicted as a single component. In other embodiments, the risk inference engine may be implemented as a cloud service or other service that is implemented using one or more servers.

Each of the IHSs 205a-n participating in the risk assessment and backup procedures may include a local monitor 210a-n. Each of the local monitors 210a-n may be configured to track various aspects of the participating IHS 205a-n. According to various embodiments, local monitor 210a-n may utilize various types of monitor components that are configured to capture various types of risk data. For instance, a local monitor may utilize sensor monitors 215a-n to capture behavioral risk data, system monitors 215a-n to capture risk data describing the hardware and software environment of a participating IHS 205a-n, and file activity monitors 255a-n to capture contextual risk data. The collected risk data from the monitoring operations of each of the local monitors 210a-n may be transmitted to a remote risk inference engine 230.

The risk inference engine 230 processes the received risk data in order to determine backup procedure recommendations for the participating IHSs 205a-n. The risk inference engine 230 may be configured to process various combinations of risk data generated by local monitor 210a-n utilized by the participating IHSs 205a-n. The risk inference engine 230 processes the risk data in order to evaluate the current backup procedures implemented by a participating IHS 205a-n where this evaluation is based on the value of the data available for backup, the risk factors associated with the manner in which an IHS is used and the hardware and software characteristics of the IHS. Based on this evaluation, the risk inference engine 230 determines whether current backup procedures implemented by the participating IHSs 205a-n are appropriate in light of the risk of loss and value of the data maintained by the IHSs 205a-n. If the risk inference engine 230 determines that current backup procedures are inadequate or misguided, alternative data backup procedures are recommended to the participating IHSs 205a-n.

The backup procedure recommendations generated by the risk inference engine 230 may be utilized by participating IHSs 205a-n to mitigate the risk of data loss. In certain scenarios, the recommendations provide by the risk inference engine 230 may include the use of different backup services that provide protection that is commensurate with the risk of loss and valuation associated with the data on the participating IHS 205a-n. As described below, the risk inference engine 230 may be configured to utilize the risk data provided by a participating IHS 205a-n to calculate a relative risk of loss for files located on the IHS. The relative risk calculation by the risk inference engine 230 may utilize risk data collected by the local monitors 210a-n.

Local monitors 210a-n may be configured according to various embodiments for determining aspects of the use of participating IHSs 205a-n. Each of the local monitors 210a-n may be configured to track various aspects of the use of the participating IHS 205a-n that may be relied upon in assessing the risk of data loss by the associated participating IHS 205a-n. For instance, local monitor 210a tracks certain uses of IHS 205a that provide indications of behavior associated with the use of IHS 205a, where this behavior reflects various risks of data loss by the IHS 205a. The local monitor 210a may also track the manner in which individual files are created and used. This context information for individual files stored on the IHS 205a may then be used to generate valuations for files, where the valuations are based on the context in which the files have been created and/or utilized. In this manner, the local monitor 210a is used to capture various types of behavioral, contextual and system information and further used to generate risk data that may be transmitted to a remote risk inference engine 230.

In certain embodiments, local monitors 210a-n utilize one or more sensor monitors 215a-n. Each of the sensor monitors 215a-n may collect data from one or more sensor components of an IHS. For instance, in scenarios where an participating IHS is a mobile device, such as certain mobile phones and laptop computer, that is outfitted with an accelerometer device that can detect the g-forces due to acceleration that are experienced by a mobile device. Using data provided by an accelerometer, a sensor monitor 215a-n may detect accelerations that indicate a participating IHS 205a-n has been dropped or otherwise subjected to rapid acceleration or deceleration that may result in damage to the device. For instance, in certain embodiments where a participating IHS 205a-n is a portable device, such as a laptop computer, tablet device, or mobile phone, a sensor monitor 215a-n may be configured to interface with an accelerometer supported by the participating IHS 205a-n. More particularly, a sensor monitor 215a-n may be configured to access accelerometer information via an interface supported by the accelerometer. In certain embodiments, the sensor monitor 215a-n may utilize an interface such as I2C (Inter-Integrated Circuit) and/or SPI (Serial Peripheral Interface) in order to access accelerometer information. In certain embodiments, the sensor monitor 215a-n may be configured to access accelerometer information via an intermediary UART (Universal Asynchronous Receiver/Transmitter) component provided by the participating IHS 205a-n.

In certain embodiments, sensor monitors 215a-n may include the ability to interface with a location information interface provided by the IHS. For instance, in scenarios where the participating IHS 205a-n includes GPS (Global Positioning System) capabilities, sensor monitors 215a-n may be configured to access certain GPS data generated by the IHS. For instance, in embodiments where the participating IHS 205a-n provides access to GPS data, the sensor monitors 215a-n may utilize an interface such as I2C, SPI and/or USB (Universal Serial Bus) in order to query a GPS interface supported by a participating IHS. In certain embodiments, the sensor monitor 215a-n may be configured to access GPS information via an intermediary UART (Universal Asynchronous Receiver/Transmitter) component provided by the participating IHS 205a-n. In such embodiments, sensor monitors 215a-n may generate data describing the movement of the IHS. Certain embodiments may utilize sensor monitors 215a-n that transmit collected GPS information to the risk inference engine 230 which calculates movement information for use in risk assessment. Using the movement information collected by the sensor monitors 215a-n, a movement history may be determined for a participating IHS 205a-n. In certain embodiments, sensor monitors 215a-n may collect movement and/or location information from logs provided by sensors and/or sensor systems incorporated into the participating IHSs 205a-n. The logs may provide raw sensor data and/or movement determinations that indicate that an IHS has been dropped or otherwise collided with.

The movement information for a participating IHSs 205a-n that is determined using sensor monitors 215a-n may be utilized by the risk inference engine 230 in the assessment of risk of data loss by the participating IHS. An IHS that is moved, even if occasionally, (e.g., a laptop computer) may be more susceptible to loss by theft and to damage than an IHS that is never moved (e.g., a desktop computer). An IHS that is moved more often (e.g., a mobile phone device) is more susceptible to loss by theft and to damage than an IHS that is moved only occasionally (e.g., a laptop computer). The location of an IHS may also be utilized in the assessment of risk for a participating IHS 205*a*-*n*.

As illustrated in the embodiment of FIG. 2, local monitors 210*a*-*n* may utilize one or more system monitors 220*a*-*n*. In order to assess the risk of loss of data stored on a participating IHS 205*a*-*n*, the system monitors 220*a*-*n* may be utilized to collect certain information regarding the hardware and/or software of a participating IHS 205*a*-*n*. For instance, the system monitors 220*a*-*n* may be used to detect that type of storage drives utilized by a participating IHS 205*a*-*n*. Different types of storage devices may provide different levels of protection with regard to data loss. For example, a magnetic hard drive is more vulnerable to certain types of failure conditions than a solid state hard drive. This vulnerability of magnetic hard drives may be more pronounced based on the manner in which the IHS is used, in particular with regard to movement of the IHS. If, for instance, the IHS is subjected to abrupt movements (e.g., the IHS is dropped or otherwise collided with), a magnetic hard drive that utilizes a spinning magnetic platter can be damaged by such movements, thus resulting in an increased risk of losing the data stored on the magnetic hard drive. An IHS that utilizes a solid state hard drive would provide better protection from data loss due to motion related events.

Such storage drive data collected by a system monitor 220*a*-*n* may be provided to the risk inference engine 230 along with other risk data. The risk inference engine 230 may then incorporate the storage drive information for the IHS into its determination of the risk of data loss by the IHS. In certain embodiments, the risk inference engine 230 may make risk determinations by combining various risk data inputs generated from the local monitors 210*a*-*n* of IHS. As described below, risk inference engine 230 may be configured to generate a risk assessment that is based on weighted scores for various data loss risk factors. In certain of such embodiments, behavior risk factors associated with data loss, such as the history of motion-related events recorded by a sensor monitor 215*a*-*n*, may be combined by the risk inference engine 230 with system information, such as the type of storage drives that are employed by the IHS, to identify scenarios where there is a high risk of data loss. System monitors 220*a*-*n* may be configured according to various embodiments to collect other data describing aspects of the IHS hardware and/or software that may provide an indication of the risk of data loss.

In certain embodiments, the system monitors 220*a*-*n* may provide general system information that may indicate a risk of data loss. For instance, system information may provide information specifying the device type of a participating IHS 205*a*-*n*, such as whether a participating IHS is a laptop computer, desktop computer, tablet or mobile device. The risk inference engine 230 may utilize such system information to infer a risk of data loss based on the relative likelihood of the IHS being lost due to the theft. In additional, this risk of data loss due to theft be elevated further if the participating IHS stores data to a removable storage drive, such as a USB flash drive or an external hard drive. The system monitors 220*a*-*n* may provide system information such as the make and model of the IHS and the operating system used by participating IHS. System monitors 220*a*-*n* may be configured to capture such system information by querying various interfaces supported by the IHS. In certain embodiments, system information may be obtained by querying internal components of the IHS, such as the BIOS (Basis Input/Output System), the system registry, the filesystem, supported bus controllers, disk controllers and/or an operating system kernel. In certain embodiments, the system monitors 220*a*-*n* may be configured to obtain information directly from hardware components installed on the IHS. For instance, system information may be obtained by querying firmware interfaces provided by devices, such as storage drives, that are installed on the IHS.

In certain embodiments, system monitors 220*a*-*n* may provide a unique identifier that can be used to query specific hardware and/or software information for a particular participating IHS 205*a*-*n*. For instance, in certain embodiments, participating IHS 205*a*-*n* may be computing devices that are uniquely identified by a Dell service tag identifier. A unique identifier for an IHS, such as a service tag can be determined by a system monitor 220*a*-*n* and provided in the risk data that is transmitted to the risk inference engine 230. A unique identifier provided in this manner by a system monitors 220*a*-*n* may then be used by the risk inference engine 230 to obtain detailed platform information for an IHS. This platform information may then be incorporated into the risk loss determinations made by the risk inference engine 230.

As illustrated in the embodiment of FIG. 2, local monitors 210*a*-*n* may utilize one or more file activity monitors 255*a*-*n* in order to collect data regarding the contextual risk factors associated with the use of a participating IHS 205*a*-*n*. Similar to the system monitors 220*a*-*n*, the file activity monitors 255*a*-*n* may be configured according to various embodiments to run as a background process and/or as a one-time process that runs on command or as part of a regularly scheduled backup procedure that is implemented by a participating IHS 205*a*-*n*. File activity monitors 255*a*-*n* may be utilized to scan for file attributes that may be used to infer a financial and/or time cost to recover files stored by a participating IHS, and to infer whether a file is an irreplaceable file created through user input.

In order to provide information describing the data stored by a participating IHS 205*a*-*n*, a file activity monitor 255*a*-*n* may be configured to scan storage locations maintained by a participating IHS 205*a*-*n* for general file and directory information that can be used by the risk inference engine 230 in assessing the replicability of this data. For instance, a file activity monitor 255*a*-*n* may summarize the files present in each operating system directory of a participating IHS 205*a*-*n*. In certain embodiments, a file activity monitor 255*a*-*n* only scans and summarizes the files present in certain directories expressly authorized by a user of the participating IHS. In certain embodiments, the file activity monitors 255*a*-*n* may summarize information such as the types of files (e.g., based on file extensions) and the sizes of files in each monitored directory. As described below, the risk inference engine 230 may be configured to utilize such directory and file data to infer the replicability and/or cost to recover the monitored files that are stored by a participating IHS 205*a*-*n*.

In certain embodiments, a file activity monitor 255*a*-*n* may be configured to scan for file attributes that indicate whether a file has been edited by a user of a participating IHS 205*a*-*n*. In certain embodiments, such file attributes may be provided by the operating system of a participating IHS 205*a*-*n*. In certain embodiments where the file activity monitors 255*a*-*n* operate as background processes, a file activity monitor 255*a*-*n* may track certain file operations that indicate the replicability of a file. For instance, a file activity monitor 255*a*-*n* may track the frequency with which individual files are accessed and modified. In this manner, a file activity monitor 255*a*-*n* may generate information that can be used to infer the amount of labor spent by a user in creating a particular file. For instance, an image file created over the course of many hours using an image editing application can be identified as a file that is likely irreplaceable. The risk inference engine 230 may utilize such file operation data in order to assess whether the current backup procedures implemented by a participating IHS 205*a-n* adequately protect such files from loss.

As illustrated in the embodiment of FIG. 2, each of the participating IHS 205*a-n* may utilize a backup component 230*a-n*. Backup components 230*a-n* may be utilized by an IHS 205*a-n* to implement various procedures for backing up files stored by the IHS. In certain embodiments, backup component 230*a-n* may implement procedures used to backup IHS 205*a-n* files to a remote storage location. In certain embodiments, backup components 230*a-n* may interoperate with other backup applications to implement the backup procedures utilized by an IHS 205*a-n*. In the illustrated embodiment, backup components 230*a-n* may be configured to create backup copies of IHS 205*a-n* files on a remote backup repository 220 and/or a cloud backup service 215.

Another aspect of the use of a participating IHS 205*a-n* that is provided as risk data to the risk inference engine 230 may include current backup procedures implemented by the participating IHS 205*a-n*. The backup modules 230*a-n* may provide risk data that describes the current backup procedures. In certain embodiments, the data provided by the backup modules 230*a-n* may list the backup procedures implemented by the participating IHS 205*a-n* and the data that is protected by each implemented procedure. For instance, the backup modules 230*a-n* may specify that a participating IHS 205*a-n* utilizes weekly backups of selected directories via a commercial cloud backup service. In other scenarios, the backup modules 230*a-n* may specify that a participating IHS 205*a-n* utilizes irregular backups of selected directories to an external storage drive and/or to an off-site backup storage repository. The backup modules 230*a-n* may also specify that no backup procedures are currently implemented by a participating IHS 205*a-n*. In certain embodiments, the backup modules 230*a-n* may be configured to report any known financial cost associated with each implemented backup procedure. As described below, the backup modules 230*a-n* may be configured to receive backup procedure recommendations generated by the risk inference engine 230.

Each of the local monitors 210*a-n* may utilize a telemetry component 225*a-n* in the transmission of risk data to the risk inference engine 230. For instance, local monitor 210*a* generates risk data using sensor monitor 215*a*, system monitor 220*a* and file activity monitor 255*a*. In certain embodiments, collected information from the configured monitors 215*a*, 220*a*, 255*a* may be collected by the local monitor 210*a*, which then generates a block of risk data for transmission by the telemetry component 225*a*. In certain embodiments, the telemetry component may 225*a* be configured to transmit risk data to the risk inference engine 230 in blocks of risk data collected by a local monitor 210*a*. In certain embodiments, the telemetry component 225*a* may be configured to transmit metadata to the risk inference engine 230 as the risk data is generated by the local monitor 210*a*, or by the configured monitors 215*a*, 220*a*, 255*a*.

Risk inference engine 230 receives risk data provided by the telemetry components 225*a-n* associated with each of the participating IHSs 205*a-n*. In certain embodiments, the risk inference engine 230 utilizes a telemetry component 250 that is configured to receive risk data from each of the participating IHSs 205*a-n*. Using the received risk data, the risk inference engine 230 may utilize a risk assessment component 235 to determine a risk of loss of data by a participating IHS 205*a-n*, where the risk is determined based on the contextual and behavioral use of the IHS as provided by the received risk data. In certain embodiments, the risk inference engine 230 may be further configured to utilize a recovery analysis component 240 to process the generated risk assessment in order to determine backup procedure recommendations that may reduce the risk of data loss by a participating IHS 205*a-n*. In certain embodiments, the recovery analysis component 240 may rely on a solutions database 245 as source of information regarding available backup procedures. Further detail describing the operation of the risk inference engine 230 is provided with respect to FIG. 4.

Figure 3:
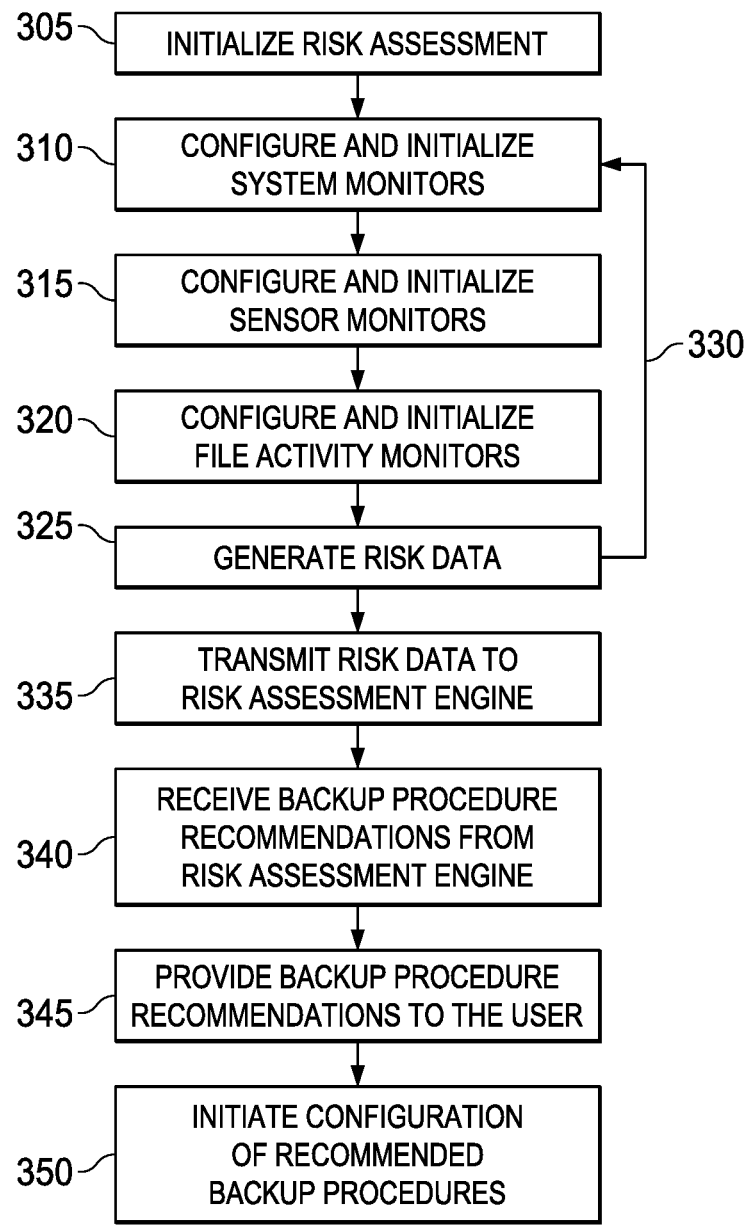
FIG. 3 is a flowchart illustrating certain steps of a process according to various embodiments by which an IHS provides data loss risk assessment.

As described, an IHS may be configured according to various embodiments to generate risk data that may be processed by a risk inference engine in order to assess the risk of data loss based on the use of the IHS. FIG. 3 illustrates certain steps of a process according to various embodiments by which certain uses of an IHS monitor are monitored for use in generating risk data that may be processed by the risk inference engine in determining the risk of loss of data by the IHS. The process of the illustrated embodiment begins at step 305 with the initialization of the risk assessment procedure by a participating IHS. In certain embodiments, the risk assessment procedure may be a process that is configured to run each time the operating system of the IHS is booted. In addition or in the alternative, the risk assessment procedure may be initiated on a periodic basis as an aspect of a regularly scheduled backup procedure implemented by an IHS. In certain embodiments, the risk assessment procedure may be initialized based on a user command issued via an administrative interface.

At step 310, any system monitors are initialized and configured for monitoring the hardware components that are installed on an IHS. In certain embodiments, the initialization of a system monitor may result in the triggering of a process that is configured to scan sources of information that identify the hardware installed on an IHS. For instance, a system monitor may be configured according to various embodiments to scan the system registry of an IHS, a device listing provided by the IHS operating system and/or device information provided by the BIOS of an IHS in order to determine the hardware installed on an IHS. This hardware scanning process may be configured to run a single time upon initialization of a system monitor, or may be configured to run on a periodic basis. Each time the scan process is run by a system monitor, the generated hardware information is provided to the local monitor for transmission as risk data to the risk inference engine.

In certain embodiments, a system monitor may be configured to obtain a unique identifier from an IHS, where the unique identifier can be used to issue a query for detailed hardware information for the IHS. For example, in certain embodiments, an IHS may be a computing device that is uniquely identified by a Dell service tag identifier. In such embodiments, the system monitor may query the IHS for its service tag identifier, which may then be provided to the risk inference engine. The service tag identifier may then be used by the risk inference engine to issue a query to a diagnostic service that is configured to provide detailed platform information for an IHS based on its service tag.

Referring back to FIG. 3, at step 315, one or more sensor monitors are initialized and configured for use in capturing sensor data that indicates a behavioral risk of loss of data stored on an IHS. Each sensor monitor may be used to collect data from one or more sensor components of an IHS.

As described, movement information and location information may be determined by a sensor monitor that is configured to obtain location information from a GPS component and configured to obtain movement information from a sensor such an accelerometer. In certain embodiments, a sensor monitor may be configured to scan logs with movement and location information that are maintained by an IHS. In this manner, a sensor monitor may provide movement and location information each time the sensor monitor is initialized, on a periodic basis and/or upon receipt of a specified command. In certain embodiments, a sensor monitor may be configured to run as a background process that tracks location and movement activity by interfacing with the sensor components that provided such information. In certain embodiments, user input may be requested in order to obtain consent for tracking movement and location information associated with a participating IHS and transmitting this data to the risk inference engine for analysis.

At step 320, one or more file activity monitors are initialized and configured. As described, file monitors may be utilized in order to track certain file operations by a participating IHS. These file operations may include the time and frequency of edits to a file by a user of a participating IHS. In addition, file activity monitors may be used to collect information, such as file types and file sizes, regarding the files that are stored by a participating IHS. In addition, the file activity monitor may capture information regarding the directory in which files are located, thus indicating whether a file is a purchased file or a user-generated file. In certain embodiments, a file activity monitor may be configured to run as a background process that tracks file operations. In other embodiment, the file activity monitor may run as a one-time process that scans storage locations used by a participating IHS for file activity data. In certain embodiments, user input may requested to obtain consent for tracking certain file operations and directory information and for transmitting this data to the risk inference engine for analysis.

With all monitors initialized and configured, at step 325, risk data is generated for transmission to the risk inference engine. The risk data that is transmitted by an IHS may be generated by specific monitoring components, such as individual sensor monitors, system monitors and/or file activity monitors. In certain embodiments, the risk data may be generated by the local monitor based on raw information received from specific monitor components. Certain embodiments may be configured to generate risk data as information is collected by the monitor components. Certain embodiments may generate risk data on a periodic basis at step 330 by reinitializing or otherwise triggering the individual monitors to generate updated risk data. At step 335, the IHS transmits the risk data to the risk inference engine.

As described, the risk inference engine may process the risk data received from a participating IHS in order to assess the risk of loss of data stored by the IHS. The risk inference engine may also generate backup procedure recommendations for consideration by a user of the participating IHS where the recommendations are intended to provide the IHS with improved data protection that is based on the actual use of the IHS. At step 340, the participating IHS that transmitted risk data to the risk inference engine receives backup procedure recommendations that mitigate certain of the behavioral and contextual risks described in the risk data. At step 345, the recommendations are provided to a user of a participating IHS. These recommendations may be provided via an interface that lists the backup procedures currently implemented by the participating IHS and a set of one or more recommendations for additional backup procedures that may be implemented by the IHS in addition to or instead of the currently procedures. At step 350, the participating IHS may be provided with an interface for configuring the recommended backup procedures.

Figure 4:
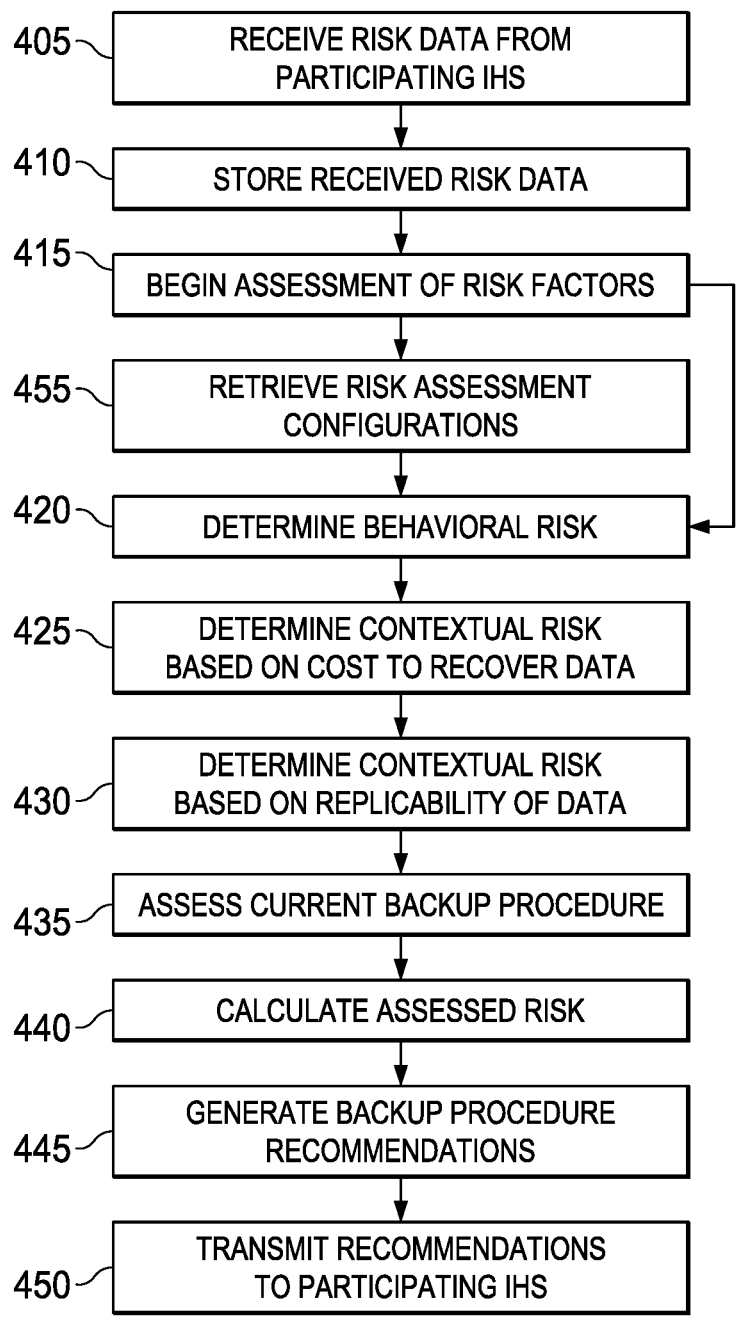
FIG. 4 is a flowchart illustrating certain steps of a process according to various embodiments by which a risk inference engine provides data loss risk assessment.

FIG. 4 illustrates certain steps of a process according to various embodiments by which a risk inference engine may provide risk assessment and backup procedure recommendations to participating IHSs. The operation of the risk inference engine begins in certain embodiments at step 405 with the receipt of risk data from participating IHSs. As described, the risk data provided by each participating IHS provides behavior and contextual information describing the use of the IHS. In certain embodiments, the risk inference engine stores the risk data received from a participating IHS. In certain embodiments, the risk inference engine may store the risk data as it is received and the risk assessment engine begins to process the risk data immediately in order to calculate a risk assessment and backup procedure recommendation. In other embodiments, the risk data may be stored to repository and queued for risk assessment by the risk inference engine.

At step 415, the risk inference engine begins the assessment of the risk of data loss for a participating IHS based on the received behavior and contextual risk data received from the participating IHS. Prior to the determination of risk, the risk inference engine may first process the received risk data in order to convert the risk data to a format used during the risk assessment process. In certain embodiments, the risk inference engine may retrieve information for configuring the risk assessment for the participating IHS. The risk inference engine may include the ability for administrators to configure the risk assessment process by adjusting the relative weightings used for scoring the different types of risk factors, where the weightings are used in generating scores for various aspects of the risk determination. At step 455, any such customizations that are applicable to the participating IHS are used to configure the risk assessment determination.

At step 420, the risk inference engine calculates the behavior risk associated with a participating IHS. As described with respect to FIG. 2, the risk inference engine may utilize system information provided by a participating IHS via a component such as a system monitor. The system information, such as the type of storage drives used by a participating IHS, may be used in combination with usage information, such as the movement and location history of the participating IHS, in order to assess the risk that data stored by the participating IHS will be lost. At step 420, the received risk data is processed by the risk inference engine in order to assess the movement and/or location history reported by for a participating IHS. The system information describing the hardware of the participating IHS may be likewise determined by the risk inference engine from the provided risk data. In certain embodiments, the risk inference engine may utilize a unique identifier provided in the risk data in order to issue a query to a diagnostic service that can provide detailed hardware information for a participating IHS based on the unique identifier. Based on the system information and the provided behavioral use data, the risk inference engine calculates a behavioral risk score.

A behavioral risk score associated with a participating IHS may be determined based on a categorization of the movement information, location information and system data associated with a participating IHS. For instance, the lowest behavior risk score may be designated for scenarios where the participating IHS is a stationary desktop computer. The next lowest behavior risk score may be designated for scenarios where the participating IHS is a laptop computer, but the laptop computer is moved infrequently. Progressively higher behavior risk scores may be designated for laptop computers that are moved frequently and laptop computers that are have a movement history that indicates the computer has been dropped or otherwise collided with. A higher behavior risk score may be designated for a laptop computer with a history of being dropped and which utilizes a magnetic hard disk. Behavior risk scores may be designated for various additional scenarios. In certain embodiments, user input provided to the risk inference engine via an administrative interface may be used to assign the relative behavior scores that are designated for different behavioral scenarios.

At step 425, the risk assessment continues with the risk inference engine calculating a contextual risk score that is based on the cost to recover or otherwise replace the data stored by a participating IHS. As described with respect to FIG. 2, a participating IHS may utilize a component such as a file activity monitor to generate risk data that may be used to infer a cost to recover files stored by a participating IHS. Similar to the scoring used for behavioral risk, the risk inference engine may calculate a score for the cost, as a time and/or financial expense that would be required to replace a file or a set of files stored by a participating IHS.

For instance, the lowest replacement cost score may be designated for scenarios where a file can be replaced without financial cost and with minimal time. As described, such replacement costs may be inferred based on file type information, such as whether digital rights management (DRM) indicators are associated with a file, the directory in which a file is stored and/or the size of a file. The next lowest replacement cost score may be designated for scenarios where a file can be replaced without financial cost, but would require significant time to recover the file. For instance, multimedia files may be obtained freely, but converting large multimedia files between formats may be a lengthy process. In another example, a user may have collections of large numbers of publically available images such as clipart that can be freely obtained, but would take significant time to re-collect this particular set of images. The next lowest replacement cost score may be designated for scenarios where a file can be replaced quickly, but does incur at substantial financial cost. For instance, purchased music files may fall in this category. The high replacement cost score may be designated for scenarios where significant time and financial cost is required to replace a file. For instance, replacing large multimedia files or video games that have been purchased may require both repurchasing the software and expending the time to download the files. Replacement cost scores may be designated for various additional scenarios. In certain embodiments, user input provided to the risk inference engine via an administrative interface may be used to assign the relative replacement cost scores that are designated for different behavioral scenarios. In certain embodiments, replacement cost scores may be generated both for individual files and for directories, where the directory replacement cost scores are based on the scores of the files stored therein.

At step 430, the risk assessment continues with the risk inference engine calculating a contextual risk score that is based on the replicability of data stored by a participating IHS. As described with respect to FIG. 2, a participating IHS may utilize a component such as a file activity monitor to generate risk data that may be used to infer the replicability of files stored by a participating IHS. Similar to the scoring used for behavioral risk and replacement cost, the risk inference engine may calculate a score for the degree to which a file can be replaced by a user without incurring a financial or time cost.

For instance, the lowest replicability score may be designated for scenarios where a file can be replaced with no financial or time cost and the file does not appear to be a unique file. As described, a file activity monitor may be configured to determine whether a file has been edited by a user. Files that have never been edited by a user are presumably not unique and thus replaceable. For instance, a collection of clip art images may be freely available in the exact form stored by the participating IHS. The next lowest replicability score may be designated for scenarios for non-unique files that can be replaced at a relatively low financial and time cost. For instance, purchased music files are non-unique and can thus be replaced relatively quickly, but with some attendant financial cost. The next lowest replicability score may be designated for scenarios where a file is not unique but would require a more significant amount of money and time to replace. For instance, large multimedia or video game files can be repurchased, but are large files and may be relatively expensive. The next lowest replicability score may be designated for scenarios where a file is unique to the participating IHS or would require a large amount of time and/or money to replace. For instance, a library of personal photographs taken by a user may be irreplaceable if the files stored by the participating IHS are lost. As another example, purchased software programs may be replaceable, but only by re-purchasing the potentially expensive software program. The highest replicability score may be designated for scenarios where a file is both expensive to replace and is unique to the participating IHS. For instance, a large word processing or spreadsheet file that has been edited for many hours by a user is presumably literally irreplaceable if the file stored by the participating IHS is lost. Replicability scores may be designated for various additional scenarios. In certain embodiments, user input provided to the risk inference engine via an administrative interface may be used to assign the relative replicability scores that are designated for different behavioral scenarios.

At step 430, the risk assessment continues with the risk inference engine assessing the current backup procedures implemented by a participating IHS. As described with respect to FIG. 2, a participating IHS may utilize a backup component that may be configured to provide the risk inference engine with information identifying the backup procedures currently implemented by a participating IHS. Similar to the scoring used for behavioral risk and contextual risk, the risk inference engine may calculate a score that reflects the adequacy of the current backup procedures implemented by a participating IHS. For instance, the lowest backup procedure score may be designated for scenarios where a participating IHS does not implement any backup procedures. The next lowest backup procedure score may be designated for scenarios where the participating IHS performs a regularly scheduled backup to an external storage drive that is at the same geographic site as the participating IHS. The next lowest backup procedure score may be designated for scenarios where a participating IHS performs a regularly scheduled backup to a single remote geographic site. The highest backup procedure score may be designated for scenarios where a participating IHS performs a regularly scheduled backup that results in the backed up data being stored in two or more remote geographic sites. Backup procedure scores may be designated for various additional scenarios. In certain embodiments, user input provided to the risk inference engine via an administrative interface may be used to assign the relative backup procedure scores that are designated for different behavioral scenarios.

At step 440, the risk inference engine combines the scoring provided for the behavioral and contextual risk of data loss and the current backup procedures to calculate a relative risk of data loss by a participating IHS. In certain embodiments, the relative risk for a participating IHS may be generated by summing the calculated scores for each of the described risk factors. Other embodiments, may weight each of the risk factor scores differently in order to emphasize the importance of certain of these risk factors. In certain scenarios, input provided by a user may emphasize certain risk factors that are in turn reflected in the weights assigned to each of the risk factors. For instance, a user may specify that the protection of irreplaceable files is extremely important such that backup procedures must ensure that these files cannot be lost.

This relative risk calculated by the risk inference engine may then be used, at step 455, to generate backup procedure recommendations to be provided to a user of a participating IHS. For instance, based on the provided risk data, the risk inference engine may determine that a participating IHS is used to store a large number of word processing documents that have been edited over the course of many hours. Accordingly, risk inference engine may generate a relative risk for the participating IHS that reflects that storage of irreplaceable files by a participating IHS that is utilizing inadequate backup procedures. In another scenario, the risk inference engine may receive risk data from a laptop computer that is used to store a large number of personal photographs and music files. Even though these photographs are irreplaceable, they are not edited. The music files may have to be repurchased if these files are lost, but music files are typically not edited by users. Consequently, the risk inference engine may determine the current backup procedure for this particular IHS provides protection from loss beyond what is required based on the contextual and behavior risk factors for this IHS. For instance, this particular IHS does not need to pay for a cloud backup service that is configured to refresh on a nightly basis. Instead, a backup service that simply provides occasional backup to a single offsite location may be adequate based on the use of the participating IHS.

In certain embodiments, the risk inference engine may consult a repository of backup solutions in order to identify a backup procedure that provides data protection that is commensurate with the needs of the user of the participating IHS. In certain embodiments, the risk inference engine may be configured to evaluate the current backup procedure based on the financial costs associated with the current backup procedures implemented by the IHS. For instance, an IHS may be configured to utilize on online backup service for which a user of the IHS is charged a fixed yearly fee. In such scenarios, the risk inference engine may be configured to evaluate the value of this backup service to the user in light of the files that are currently being backed up to this service. For instance, the backup procedure implemented by an IHS may indicate that the only files being backed up to the online service are unedited music files that can be repurchased for a relatively modest sum and are being stored by a desktop computer that has a low probability of failure. In such scenarios, the risk inference engine may determine that the user should implement a cheaper backup solution and may further consult the repository of known backup solutions in order to provide the user with recommendations that would provide the user with better value. At step 450, the backup procedure recommendations that are generated by the risk inference engine are transmitted to the participating IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for improving data backup procedures utilized by an IHS (Information Handling System), the method comprising:

receiving risk data describing the use of a first IHS, wherein the risk data includes information describing file operations on the first IHS, wherein the risk data further includes information describing physical use of the first IHS, and wherein the risk data identifies a current data backup procedure implemented by the IHS;

determining, based on the risk data, platform information for the first IHS, wherein the platform information specifies hardware installed on the first IHS;

determining, based on the received risk data and the platform information, a behavioral risk of loss of data stored by the first IHS;

determining, based on the received risk data, a contextual risk of loss of data stored by the first IHS, wherein the risk data describes a cost to replace a file stored by the IHS, and wherein the cost to replace the file is determined based on whether the file has been edited by a user of the IHS and on a time duration spent editing the file by the user of the IHS;

evaluating the current backup procedure of the first IHS based on the determined behavioral risk of loss and the determined contextual risk of loss; and transmitting a recommended backup procedure to the first IHS, wherein the first IHS is configured to execute the recommended backup procedure, and wherein the recommended backup procedure is generated based upon the evaluation to reduce at least one of: the behavioral or contextual risk of loss of data.

2. The method of claim 1, wherein the behavioral risk is determined based on risk data describing movement of the IHS.

3. The method of claim 2, wherein the behavioral risk is determined further based on risk data describing the types of data storage devices utilized by the IHS.

4. A method for improving data backup procedures utilized by an IHS (Information Handling System), the method comprising:

generating first risk data describing one or more physical movements of the IHS, wherein the physical movement information is generated by a sensor component of the IHS;

generating second risk data describing a cost to replace a file stored by the IHS, wherein the cost to replace the file is determined based on a time duration spent editing the file by the user of the IHS;

transmitting the first risk data and the second risk data to a remote risk assessment service, wherein the remote risk assessment service evaluates the current backup procedure based on the first risk data and the second risk data;

receiving, from the remote risk assessment service, a backup procedure recommendation; and executing the recommended backup procedure, wherein the recommended backup procedure reduces the risk of loss of data stored by the IHS.

5. The method of claim 4, further comprising:

generating third risk data describing hardware properties of the IHS, wherein the hardware properties identify one or more data storage devices utilized by the IHS; and transmitting the third risk data to the remote risk assessment service; wherein the current backup procedure is evaluated based on the ability of the one or more data storage devices to operate without failure during the physical movements described by the first risk data.

6. The method of claim 4, wherein the physical movement information is generated by an accelerometer component of the IHS.

7. The method of claim 4, wherein the physical movement information is generated by a GPS (global positioning system) component of the IHS.

8. An IHS (Information Handling System), comprising:

a host processor;

a movement sensor configured to provide movement information describing physical movement of the IHS; and a computer-readable medium coupled to the host processor, the computer-readable medium having program instructions stored thereon that, upon execution by the host processor, cause the IHS to:

retrieve movement information from the movement sensor;

generate first risk data describing one or more physical movements of the IHS;

generate second risk data describing a cost to replace a file stored by the IHS, wherein the cost to replace the file is determined based upon a time duration spent editing the file by the user of the IHS;

transmit the first risk data and the second risk data to a remote risk assessment service, wherein the remote risk assessment service evaluates the current backup procedure based on the first risk data and the second risk data;

receive, from the remote risk assessment service, a backup procedure recommendation; and execute the backup procedure, wherein the recommended backup procedure reduces the risk of loss of data stored by the IHS.

9. The IHS of claim 8, wherein the program instructions, upon execution by the host processor, further cause the IHS to:

generate third risk data describing hardware properties of the IHS, wherein the hardware properties identify one or more data storage devices utilized by the IHS; and transmit the third risk data to the remote risk assessment service; wherein the current backup procedure is evaluated based on the ability of the one or more data storage devices to operate without failure during the physical movements described by the first risk data.

10. The IHS of claim 8, wherein the movement sensor is an accelerometer component of the IHS.

11. The IHS of claim 8, wherein the movement sensor is a GPS (global positioning system) component of the IHS.

* * * * *